United States Patent
Squires

(10) Patent No.: US 11,167,896 B2
(45) Date of Patent: Nov. 9, 2021

(54) CONTAMINANT RESISTANT PRODUCT PACKAGING

(71) Applicant: Charlotte Squires, Spokane, WA (US)

(72) Inventor: Charlotte Squires, Spokane, WA (US)

(*) Notice: Subject to any disclaimer, the term of this patent is extended or adjusted under 35 U.S.C. 154(b) by 43 days.

(21) Appl. No.: 16/707,965

(22) Filed: Dec. 9, 2019

(65) Prior Publication Data

US 2021/0171256 A1    Jun. 10, 2021

(51) Int. Cl.
  *B65D 53/08* (2006.01)
  *B65D 81/20* (2006.01)
  *B32B 1/02* (2006.01)

(52) U.S. Cl.
  CPC ............. *B65D 53/08* (2013.01); *B32B 1/02* (2013.01); *B65D 81/2084* (2013.01); *B32B 2307/31* (2013.01); *B32B 2439/70* (2013.01)

(58) Field of Classification Search
  CPC ...... B65D 53/08; B65D 81/2084; B32B 1/02; B32B 2307/31; B32B 2439/70
  See application file for complete search history.

(56) References Cited

U.S. PATENT DOCUMENTS

| | | | | |
|---|---|---|---|---|
| 4,672,684 A * | 6/1987 | Barnes | ............. | B65D 31/04 383/45 |
| 5,922,428 A * | 7/1999 | Pufahl | ............. | C09J 7/30 428/42.1 |
| 6,170,985 B1 * | 1/2001 | Shabram, Jr. | ......... | B65D 33/01 383/100 |
| 7,063,228 B2 * | 6/2006 | Mita | ............. | B65D 77/02 220/495.03 |
| 8,087,827 B2 * | 1/2012 | Mir | ............. | A47J 36/027 383/102 |
| 9,016,944 B2 * | 4/2015 | Mir | ............. | B65D 33/01 383/102 |
| 2003/0123758 A1 * | 7/2003 | Mita | ............. | B65D 81/3461 383/38 |
| 2004/0096128 A1 * | 5/2004 | Shibata | ............. | B65D 77/225 383/101 |
| 2006/0257056 A1 * | 11/2006 | Miyake | ............. | B65D 77/225 383/103 |

(Continued)

OTHER PUBLICATIONS

Zhang et al., "Tuning the gradient structure of highly breathable, permeable, directional waster transport in b-layered Janus fibrous membranes using electrospinning", Royal Society of Chemistry, RSC Adv., 2020, 10, 13529-3538.

*Primary Examiner* — Peter N Helvey
(74) *Attorney, Agent, or Firm* — Mohr Intellectual Property Law Solutions, PC

(57) ABSTRACT

A sealable enclosure is disclosed that is configured to enclose an object that is to be heated, wherein heating of the sealable enclosure with the object sealed therein permits gas generated by the heating to vent out through a first micro-perforation portion disposed in a fold of film layer. Initially, the generated gas is retained in the sealable enclosure. When the temperature of the strip of heat sensitive adhesive reaches a threshold temperature, the strip of heat sensitive adhesive releases so that fold opens, wherein the gas vents through the micro-perforation portion disposed in the film layer out into an ambient region surrounding the sealable enclosure while preventing ambient contaminates in the ambient region from entering into the sealable enclosure.

15 Claims, 3 Drawing Sheets

(56) References Cited

U.S. PATENT DOCUMENTS

| | | | | |
|---|---|---|---|---|
| 2007/0263948 A1* | 11/2007 | Buchman | ............... | B65D 33/01 |
| | | | | 383/103 |
| 2009/0092819 A1* | 4/2009 | Malik | ................... | A61K 9/7092 |
| | | | | 428/305.5 |
| 2014/0233868 A1* | 8/2014 | Knutzon | ................ | B65D 31/12 |
| | | | | 383/40 |
| 2014/0241649 A1* | 8/2014 | Bockmann | ............. | B65D 33/01 |
| | | | | 383/103 |
| 2016/0101916 A1* | 4/2016 | Grijalva Varillas | ...... | B32B 5/22 |
| | | | | 383/102 |
| 2019/0023478 A1* | 1/2019 | Varriano-Marston | ........................ | |
| | | | | B65D 81/3461 |

\* cited by examiner

CONTAMINANT RESISTANT PRODUCT PACKAGING

BACKGROUND

The present disclosure relates generally to product packaging. Known product packaging is not satisfactory for situations where contamination from ambient contaminants is of concern. For example, a gluten free product cannot be baked in an ambient environment that is not entirely free of gluten particles. In such situations where cooking occurs in an ambient environment with gluten contamination, the gluten free product may become contaminated with gluten particles from the ambient environment during baking and/or during handling of the baked product after baking.

As another example, some individuals are highly allergic to peanuts or other particles. When a meal is prepared for such at-risk individuals, special procedures and/or equipment is required for safe food preparation so that the prepared meal is not contaminated with peanut particles.

As yet another example, some non-food product items may need to be heated in a package such that ambient contaminants do not enter the product package during and/or after heating. An example is sterilization of medical equipment.

Accordingly, there exists a need in the product packaging arts for improved product packaging that protects packaged products for contaminants.

SUMMARY

The present disclosure is directed to a sealable enclosure that is configured to enclose an object that is to be heated, wherein heating of the sealable enclosure with the object sealed therein permits gas generated by the heating to vent out through a first micro-perforation portion disposed in a fold of film layer. Initially, the generated gas is retained in the sealable enclosure. When the temperature of the strip of heat sensitive adhesive reaches a threshold temperature, the strip of heat sensitive adhesive releases so that fold opens, wherein the gas vents through the micro-perforation portion disposed in the film layer out into an ambient region surrounding the sealable enclosure while preventing ambient contaminates in the ambient region from entering into the sealable enclosure.

DETAILED DESCRIPTION

Heating of a sealable enclosure embodiment with an object sealed therein permits gas generated by the heating to vent out from the sealable enclosure into an ambient region surrounding the sealable enclosure while preventing ambient contaminates in the ambient region from entering into the sealable enclosure. The disclosed sealable enclosure embodiments will become better understood through review of the following detailed description in conjunction with the figures. The detailed description and figures merely provide examples of the various invention embodiments described herein. Those skilled in the art will understand that the disclosed example embodiments may be varied, modified, and altered without departing from the scope of the invention as described herein. Many variations are contemplated for different applications and design considerations. However, for the sake of brevity, each and every contemplated variation is not individually described in the following detailed description.

Throughout the following detailed description, examples of various sealable enclosure embodiments are provided. Related features in the example embodiments may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example embodiment.

The following definitions apply herein, unless otherwise indicated. "Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder. "Comprising," "including," and "having" (and conjugations thereof) are used interchangeably to mean including but not necessarily limited to, and are open-ended terms not intended to exclude additional elements or method steps not expressly recited. Terms such as "first", "second", and "third" are used to distinguish or identify various members of a group, or the like, and are not intended to denote a serial, chronological, or numerical limitation. "Coupled" means connected, either permanently or releasably, whether directly or indirectly, through intervening components. "Sealably join" or the like means that two adjacent surfaces are affixed together (sealed together) in a manner such that fluids and/or gasses cannot pass between the two joined surfaces.

Figure 1:
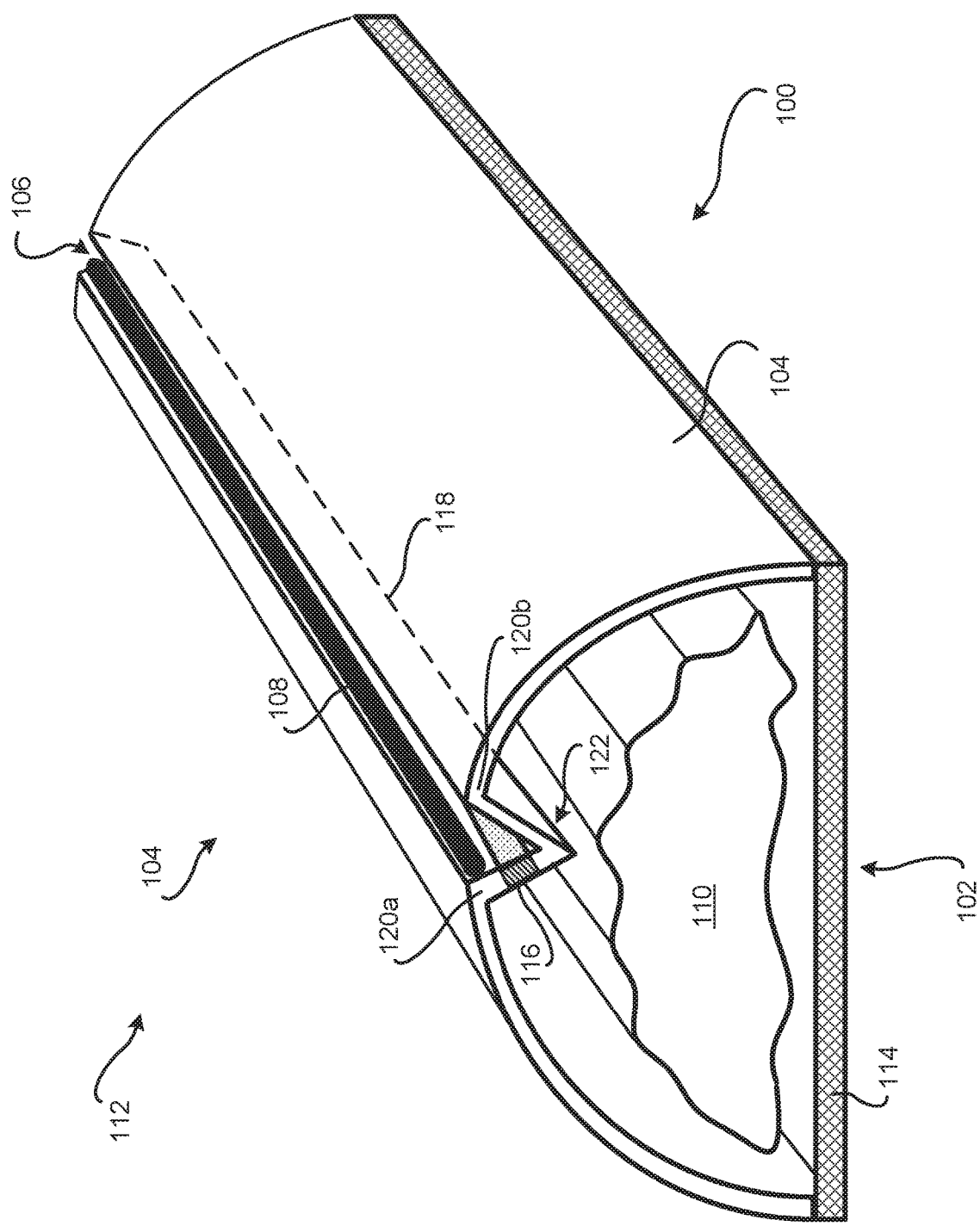
FIG. 1 is a perspective view of an example sealable enclosure embodiment.

Micro-perforated food packaging is a type of perforated packaging that contains micro holes, which enable gas permeation to maintain the rate of respiration of food products. Micro-perforation involves the puncturing of packaging films with holes ranging from, but not limited to, a diameter of 30 microns (μm) to 200 μm. Micro-perforated food packaging offers various advantages including extended shelf life and moisture retention of the food products. Embodiments of the sealable enclosure employ micro-perforation (a micro-perforation portion of the packaging) in a novel manner to prevent contamination from ambient contaminants when the object that is enclosed within the sealable enclosure is heated FIG. 1 is a cross sectional, perspective view of an example embodiment of a sealable enclosure 100. The sealable enclosure 100 comprises an enclosure 102 defined by a film layer 104 with a fold 106 and a strip of heat sensitive adhesive 108. In an example embodiment, the fold 106 may be envisioned as a simple "V" shaped fold, though any type of fold shape may be used in the various embodiments.

The film layer 104 is disposed on an upper portion of the sealable enclosure 100. Preferably, the film layer 104 is made of a flexible, semi-flexible, or semi-rigid material to enable opening of the fold 106 during the heating process.

The sealable enclosure 100 is configured to enclose an object 110 that is to be heated while in an ambient region 112. Gas that is generated by the heating of the object 110 is allowed to vent out from the sealable enclosure 100 into the ambient region 112 surrounding the sealable enclosure 100 while preventing ambient contaminates residing in the ambient region 112 from entering into the sealable enclosure 100.

Prior to heating, the object 110 is inserted into the enclosure 102 and then the enclosure 102 is sealed. Any suitable sealing process and/or apparatus may be used to seal the object 110 within the enclosure 102. Further, since the object 110 has been sealed into the enclosure 102, contaminants cannot enter into the inside of the enclosure 102 to contaminate the object 110. For example, prior to heating, the object 110 cannot be contaminated during transportation to the heating site and/or during handling of the sealable enclosure 100 by individuals.

To illustrate a practical application of the use of example sealable enclosure 100 embodiments, the object 110 may be a formed piece of gluten free dough that is to be baked into a gluten free loaf of bread while encased within the sealable enclosure 100. In an example heating application, the ambient region 112 may be the inside of a baking oven. If gluten-based dough has been previously baked within the oven, then residual gluten particles may still reside inside of the oven (the ambient region 112). Embodiments of the sealable enclosure 100 prevent contamination of the gluten free dough (the object 110) by preventing gluten particles in the ambient region 112 from entering into the sealable enclosure 100 during the baking process.

As another application, the object 110 may be a liquid or semi-liquid, like milk or apple sauce, that is to be sterilized. In such applications, the size (diameter) of the micro-perforations are defined to prevent liquid from passing through the micro-perforations while permitting the generated gas to pass through the micro-perforations. As yet another application, the object 110 may be a physical object such as a medical instrument that is to be sterilized in an autoclave.

In some embodiments, the enclosure 102 comprises a base portion 114 and the film layer 104. The fold 106 is disposed in a selected location along a length of the film layer 104. In the various embodiments, the fold 106 may be located at any desired location, any desired length, any desired orientation, and may be of any desired size and/or shape. The fold 106 is defined by a fold line 118 and two upper fold edges 120a, 120b. A strip of heat sensitive adhesive 108 extends along a length of the two upper fold edges 120a, 120b of the fold 106 so as to be disposed just below and proximate to the two upper fold edges 120a, 120b. The strip of heat sensitive adhesive 108 sealably affixes the two upper fold edges 120a, 120b together.

A micro-perforation portion 116 is located between the fold line 118 and the strip of heat sensitive adhesive 108. The base portion 114 and the upper enclosure portion are impenetrable to the generated gas and the ambient contaminates. The micro-perforation portion 116 is configured to permit the gas generated by the heating to initially vent out from the enclosure 102. One skilled in the art appreciates that the embodiment shown in FIG. 1 illustrates the open fold 106 after the strip of heat sensitive adhesive 108 has released during the heating process.

The micro-perforation portion 116 is a structure, such as layer of film, paper or the like, with a plurality of small diameter holes therein. Any suitable size (width and/or length) of the micro-perforation portion 116 may be used in the various embodiments. Further, any suitable number of micro-perforations (micro-holes) may be used for the micro-perforation portion 116. In some embodiments, the micro-perforation portion 116 may comprise multiple discrete micro-perforation portions residing in suitable locations of the film layer 104.

In some embodiments, the micro-perforation portion 116 is formed in a selected region on the film layer 104. A plurality of micro-perforation portions may be formed by perforating the structure using a die or a laser.

During the heating process, in some embodiments, the gas vents out through the micro-perforation portion 116 into a cavity region 122 in the fold 106 formed between the fold line 118 of the fold and the strip of heat sensitive adhesive 108.

In some embodiments, the base portion 114 and the film layer 104 are fabricated from the same piece of material. For example, but not limited to, the enclosure 102 may be a tube of packaging material, wherein the fold is formed by folding a portion of the tube of the packaging material.

In another embodiment, the base portion 114 may be separate from the film layer 104, such that the edges of the base portion 114 and the film layer 104 are joined together in a sealable manner. For example, the base portion 114 may be made from a rigid material that supports the object 110. In contrast, the film layer 104 may be a flexible, semi-flexible, or semi-rigid structure to facilitate packaging and/or heating of the object 110. Depending upon the embodiment, an adhesive may be used to sealably join the edges of the base portion 114 and the film layer 104. Alternatively, a crimp or other structure may be used to sealably join the edges of the base portion 114 and the film layer 104. In another embodiment, the edges of the base portion 114 and the film layer 104 are sealably joined using heat and/or pressure.

In a preferred embodiment, the strip of heat sensitive adhesive 108 runs along the top portion along the length of the fold 106. In some embodiments, the strip of heat sensitive adhesive 108 extends from the front edge to the back edge of the film layer 104 when the fold 106 extends to the edges of the film 104. The strip of heat sensitive adhesive 108 adhesively joins and seals the top of the fold 106 (proximate to the two upper fold edges 120a, 120b) prior to the heating process.

Figure 2:
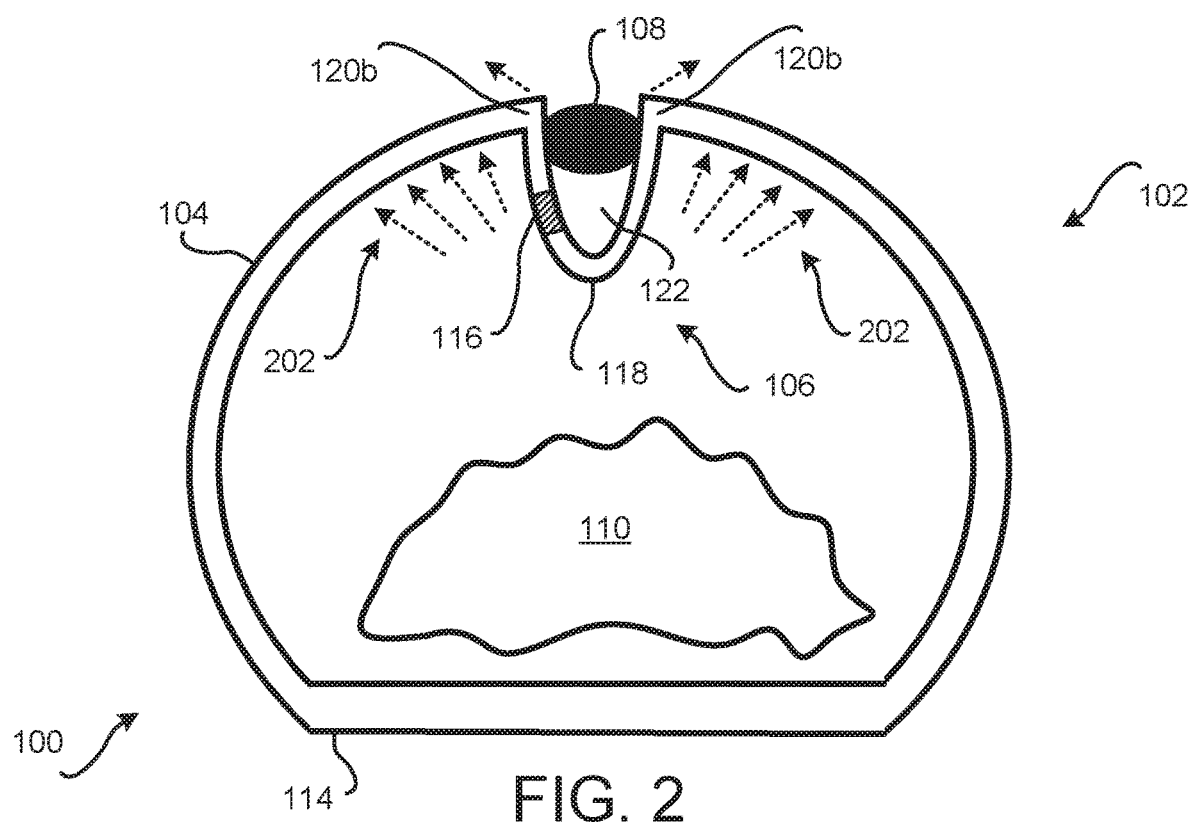
FIG. 2 is a cross sectional view of the example embodiment shown in FIG. 1 prior to heating.

FIG. 2 is a cross sectional view of the example embodiment shown in FIG. 1 prior to heating to conceptually illustrate that the strip of heat sensitive adhesive 108 adhesively joins and seals the top regions of the fold 106 proximate to the two upper fold edges 120a, 120b. During the heating process, one skilled in the art appreciates that gas is generated as increasing temperature within the enclosure 102 causes vaporization of liquids residing within the object 110 and/or residing in the interior of the enclosure 102. The generated gas in the interior of the enclosure 102 expands the enclosure 102, thereby generating outward directed forces (conceptually illustrated by the dashed arrows 202) that would tend to open the fold 106. Also, pressure within the cavity region 122 generated from the venting gas may exert an additional separation force tending to separate the fold 106.

However, during the initial stages of heating, the strip of heat sensitive adhesive 108 acts to prevent the opening of the fold 106. Because the heat sensitive adhesive 108 binds top portions of the fold 106 along the two upper fold edges 120a, 120b, an unexpected benefit is that no contaminates from the ambient region 112 are able to enter into the interior of the enclosure 102 during the initial stages of the heating process, thereby preventing the object 110 from becoming contaminated. That is, at this juncture in the heating process, it is not possible for the object 110 to become contaminated since the strip of heat sensitive adhesive 108 sealing the two upper fold edges 120a, 120b of the fold acts as an impenetrable barrier, or a substantially impenetrable barrier, between the object 110 and the ambient region 112.

As the heating process continues, the temperature of the strip of heat sensitive adhesive 108 increases. At some point during the heating process, the temperature of the strip of heat sensitive adhesive 108 reaches its predefined release temperature. When the temperature of the strip of heat sensitive adhesive 108 reaches a predefined threshold temperature, the strip of heat sensitive adhesive 108 releases, and the outward directed forces 202 tend to open up the fold 106 such that the micro-perforation portion 116 then becomes exposed to the ambient region 112 (FIG. 1).

After the strip of heat sensitive adhesive 108 releases the two upper fold edges 120a, 120b and the fold 106 opens, the gas generated in the interior of the enclosure 102 vents out through the micro-perforation portion 116 into the ambient region 112. The venting gas (venting outward into the ambient region 112), and the associated gas pressure within the sealable enclosure 100 (which is greater than the pressure of the ambient region 112), prevents any contaminants that may be in the ambient region 112 from entering into the interior of the enclosure 102. When the heating process is complete, the sealable enclosure 100 may be moved to a contaminant free, or substantially contaminant free, area for cooling.

In the various embodiments, the threshold temperature at which the strip of heat sensitive adhesive 108 releases is a temperature that is higher than the temperature at which gas is generated within the enclosure 102. Returning to the example of baking gluten free dough, one skilled in the art appreciates that the dough typically is baked in an oven at a temperature of between 325° F. (degrees Fahrenheit) and 425° F. Further, water is known to change from a liquid state to a gas state at a temperature of 212° F. Thus, as the temperature of the dough begins to exceed 212° F., the dough begins to release steam (gas) into the interior region of the enclosure 102. As the gas pressure increases and the temperature of the strip of heat sensitive adhesive 108 increases to the predefined threshold temperature, the strip of heat sensitive adhesive 108 begins to release. The fold 106 opens and the steam (gas) then vents through the micro-perforation portion 116 out into the ambient region 112.

In the various embodiments, any suitable material may be used for the components of the sealable enclosure 100. Such materials include, but are not limited to, plastic, cardboard, paper, polyethylene, polypropylene, metal, cellosic membranes, or the like. Depending upon design choice and the nature of the object 110 that is to be enclosed within the sealable enclosure 100, the various components may be made of a rigid material, a semi-rigid material, a flexible material, and/or a semi-flexible material. The various packaging materials preferably withstand heating temperatures in excess of the above-described baking temperatures (e.g. 425° F.), and may be reliably processed using suitable thermoforming packaging machines with high efficiency. An example packaging material is the MultiCook™ heat-resistant film, provided by MULTIVAC, which is an ovenproof pack used for cooking food. MultiCook™ is suitable for foods that contain protein, such as meat, fish and poultry, as well as vegetables and convenience foods. Any suitable material now known or later developed are intended to be within the scope of this disclosure.

Furthermore, the predefined threshold temperature that the strip of heat sensitive adhesive 108 releases may be defined based on the type and/or characteristics of the adhesive material. Any suitable material may be used for the strip of heat sensitive adhesive 108.

One skilled in the art appreciates that the various packaging materials used by the various embodiments may be semi-permeable on a microscopic level. However, embodiments employ packaging materials that preferably act as a barrier to the generated gases and particle contaminates, such that the generated gas vents through the micro-perforation portion 116 after the strip of heat sensitive adhesive 108 releases and the fold opens.

Figure 3:
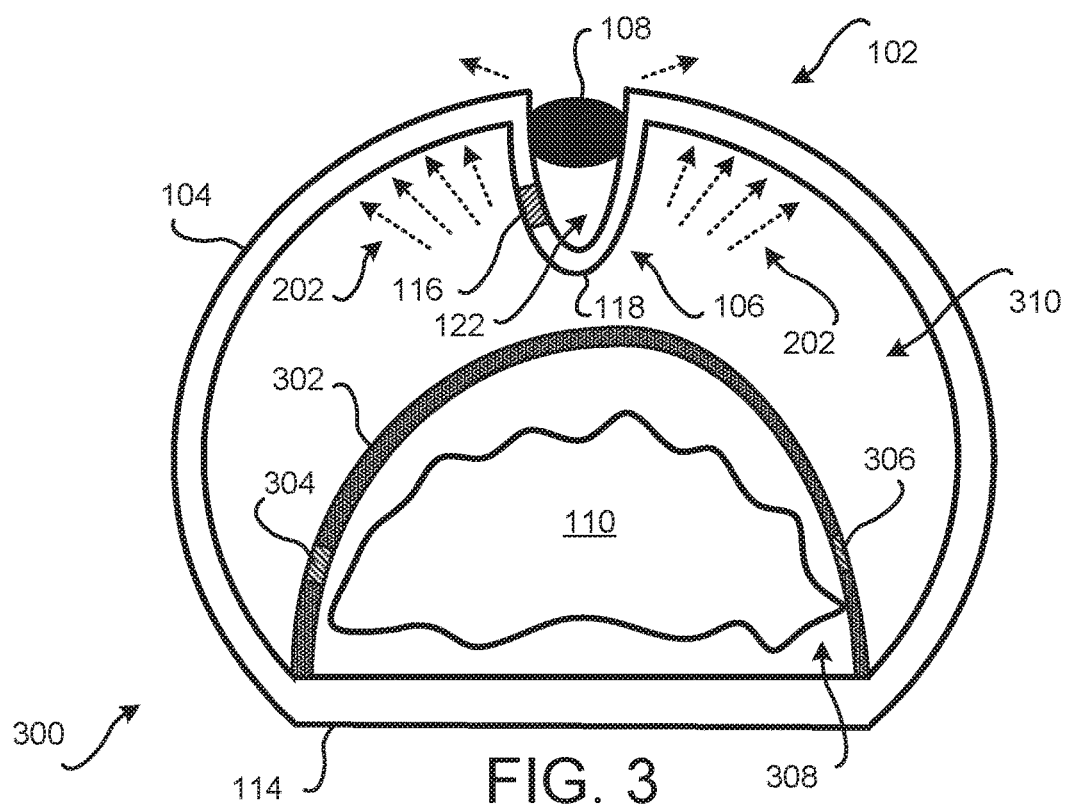
FIG. 3 is a cross sectional view of an example first alternative embodiment before release of strip of heat sensitive adhesive during the heating process.

FIG. 3 is a cross sectional view of an example first alternative embodiment of a sealable enclosure 300 before release of strip of heat sensitive adhesive 108 during the heating process. In this example embodiment, the enclosure 102 comprises the base portion 114, the upper film layer 104, and an intermediate layer 302 disposed between the film layer 104 and the base portion 114. The object 110 is placed between the base portion 114 and the intermediate layer 302.

In the various embodiments, the intermediate layer 302 may be fabricated from semi-flexible, semi-rigid, and/or rigid materials such that the bottom surface of the intermediate layer 302 does not collapse onto the top surface of the object 110. Such embodiments may be desirable in situations such as baking bread or deserts wherein contact of the intermediate layer 302 might damage the heated object 110

The intermediate layer 302 comprises at least one micro-perforation portion 304. Alternatively, the intermediate layer 302 may have a plurality of micro-perforation portions, such as the illustrated second micro-perforation portion 306. The micro-perforation portions 304, 306 may be located in any desirable location in the intermediate layer 302. The other portions of the intermediate layer 302 are impenetrable to the generated gas and the ambient contaminates. Alternative embodiments may have any suitable number of micro-perforation portions of any suitable size and/or shape that are located at any desirable location in the intermediate layer 302.

The micro-perforation portions 304, 306 are configured to permit the gas generated by the heating to initially vent out from a first interior region 308 into the enclosure 102 that is created by the base portion 114 and the intermediate layer 302 (where the object 110 resides). At some point during the heating process, the generated gases vent through the micro-perforation portions 304, 306 into a second interior region 310 that is between the intermediate layer 302 and the film layer 104. During this stage of the heating process, the venting gas is retained within the second interior region 310. Eventually, as the temperature rises, the strip of heat sensitive adhesive 108 that seals the fold 106 releases and the fold 106 opens so that the gas that has vented into the second interior region 310 vents through the micro-perforation portion 116.

Figure 4:
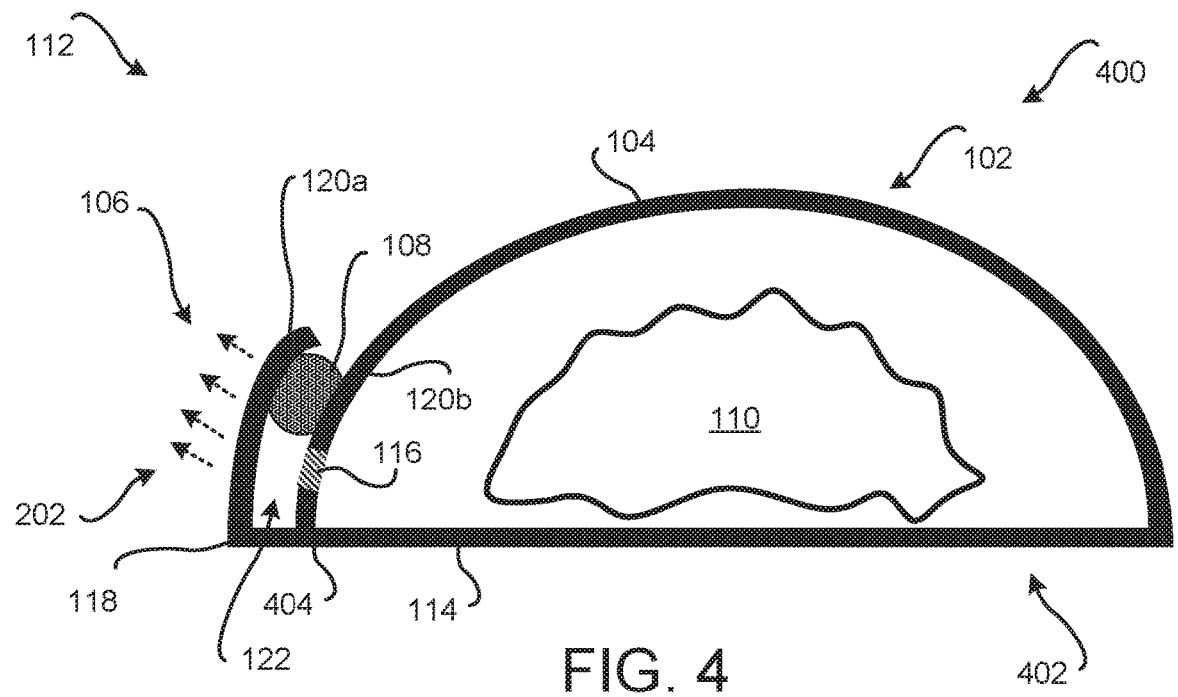
FIG. 4 is a cross sectional view of an example second alternative embodiment before release of strip of heat sensitive adhesive during the heating process.

FIG. 4 is a cross sectional view of an example first alternative embodiment of a sealable enclosure 400 before release of strip of heat sensitive adhesive during the heating process. The sealable enclosure 400 may be fabricated using a single sheet 402 of packaging material. The sheet 402 can be sealed at 404, and then a portion of the outward extending base portion 114 may be folded to create the fold 106. The strip of heat sensitive adhesive 108 may then be added to seal the two upper fold edges 120a, 120b of the fold 106 to the film layer 104. There, the upper fold edge 120a is an edge of the base portion 114, and the upper fold edge 120b is a portion of the film layer 104 that is proximate to the edge 120a.

After the object 110 is placed on the base portion 114, the ends are sealed. Accordingly, the object 110 is sealed inside the sealable enclosure 400 and the strip of heat sensitive adhesive 108 now acts as a barrier to contaminants from entering into the enclosure 102 via the micro-perforation portion 116.

During fabrication, the micro-perforation portion 116 is formed in the sheet 402 as illustrated to facilitate venting of the gas during the heating process. As the heating process progresses, gas vents into the interior of the sealed fold 106, thereby generating outward directed forces (conceptually illustrated by the dashed arrows 202) that would tend to open the fold 106. When the temperature reaches the release temperature, the strip of heat sensitive adhesive 108 releases so that the gas may then vent out into the ambient region 112.

In an alternative embodiment, the sealable enclosure 400 includes an intermediate layer (not shown) with at least one micro-perforation portion. Such an embodiment is described above and is illustrated in FIG. 3.

Figure 5:
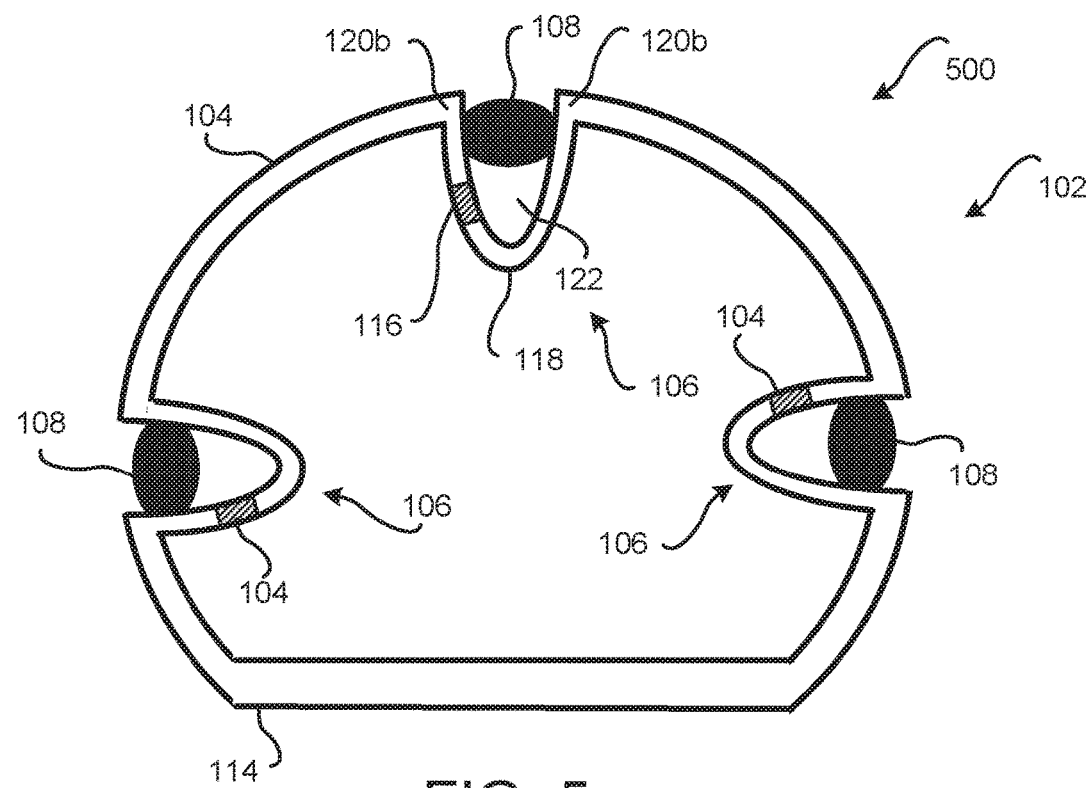
FIG. 5 is a cross sectional view of an example third alternative embodiment with a plurality of sealed folds in the film layer.

FIG. 5 is a cross sectional view of an example third alternative embodiment of the sealable enclosure 500 with a plurality of sealed folds 106 in the film layer 104. Here, any suitable number of folds 106 may be formed into the film layer 104. The folds 106 may be of any suitable length, size, and/or shape. Each of the folds 106 are sealed with their own strip of heat sensitive adhesive 108, and each fold 106 has its their own micro-perforation portion 116. The plurality of folds 106 cooperatively act together to vent gas to the ambient region 112 when the respective strip of heat sensitive adhesive 108 releases. In some embodiments, the predefined release temperature is the same for the plurality of folds 106. In other embodiments, one or more of the predefined release temperatures may be different so that selected folds 106 open at different heating temperatures.

In some applications, after the heating of the object has been completed, the generation of additional gas ceases. The sealable enclosure 100 (300, 400, 500) may then be moved into a cooling environment so that the sealable enclosure 100 (300, 400, 500) and the object 110 begin to cool. Preferably, the cooling environment is free of contaminants. Alternatively, the heat source may be removed such that the sealable enclosure 100 (300, 400, 500) and the object 110 therein begin to cool.

Depending upon the embodiment, the structure of the sealable enclosure 100 (300, 400, 500) may change as the cooling process proceeds. In one type of embodiment wherein the film layer 104 is flexible, the film layer 104 may collapse as the pressure within the enclosure 102 decreases as a result of cooling gas. Even if some contaminants do flow through the micro-perforation portion 116, the sealable enclosure 100 (300, 400, 500) may be relocated during the cooling to a place where there are less contaminants and/or non-harmful contaminants.

In other embodiments, the fold 106 may be configured to re-close so that the strip of heat sensitive adhesive 108 may re-seal itself as it cools. Here, the strip of strip of heat sensitive adhesive 108 sealably re-joins the top of the fold 106. Accordingly, the strip of heat sensitive adhesive 108 again acts as a barrier to any contaminants reaching the object 110. Such embodiments may be particularly useful for sterilization of foods, medical instruments, or other objects.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A sealable enclosure configured to enclose an object that is to be heated, wherein heating of the sealable enclosure with the object sealed therein permits gas generated by the heating to vent out from the sealable enclosure into an ambient region surrounding the sealable enclosure while preventing ambient contaminates in the ambient region from entering into the sealable enclosure, the sealable enclosure comprising:
   a film layer with a fold formed therein, wherein the fold is defined by a fold line and two upper fold edges;
   a strip of heat sensitive adhesive extending along a length of the fold, wherein the strip of heat sensitive adhesive is proximate to the two upper fold edges of the fold; and
   a micro-perforation portion that is located in the fold of the film layer between the fold line and the strip of heat sensitive adhesive,
   wherein when a temperature of the strip of heat sensitive adhesive is less than a predefined release temperature, the strip of heat sensitive adhesive seals the two upper fold edges together to prevent ambient contaminants from entering into the sealable enclosure via the micro-perforation portion.

2. The sealable enclosure of claim 1,
   wherein in response to the heating of the sealable enclosure with the object sealed therein, gas is initially generated within the sealable enclosure by the heating of the object,
   wherein gas pressure of the gas exerts a force that tends to open the fold that is sealed by the strip of heat sensitive adhesive such that the fold does not yet open,
   wherein in response to the strip of heat sensitive adhesive later reaching the predefined release temperature, the strip of heat sensitive adhesive releases so that the fold opens, and wherein the pressurized gas vents out through the micro-perforation portion into the surrounding ambient region while preventing ambient contaminates from entering into the sealable enclosure.

3. The sealable enclosure of claim 1,
wherein in response to the heating of the sealable enclosure with the object sealed therein, gas is initially generated within the sealable enclosure by the heating of the object,
wherein the gas vents out through the micro-perforation portion into a cavity region in the fold formed between the fold line of the fold and the strip of heat sensitive adhesive,
wherein in response to the strip of heat sensitive adhesive later reaching the predefined release temperature, the strip of heat sensitive adhesive releases so that the fold opens, and
wherein the pressurized gas vents out through the micro-perforation portion into the surrounding ambient region while preventing ambient contaminates from entering into the sealable enclosure.

4. The sealable enclosure of claim 3, wherein pressure within the cavity region generated from the venting gas exerts a separation force tending to separate the two upper fold edges of the fold.

5. The sealable enclosure of claim 1, further comprising:
a base portion that is sealably affixed to the film layer to form the sealable enclosure that encloses the object.

6. The sealable enclosure of claim 5, wherein the base portion that is sealably affixed to the film layer is made of a semi-rigid to rigid material that supports the object, and wherein the film layer is made of a flexible or semi-flexible material that permits the fold to open when the strip of heat sensitive adhesive releases.

7. The sealable enclosure of claim 5, wherein the base portion, the film layer and the fold therein is made from a single piece of flexible or semi-flexible material that permits the fold to open when the strip of heat sensitive adhesive releases.

8. The sealable enclosure of claim 7, wherein the fold is formed from an end portion of the base portion such that a first one of the two upper fold edges is at an edge of the base portion and a second one of the two upper fold edges is at a proximate portion of the film layer.

9. The sealable enclosure of claim 1, wherein after completion of the heating, the gas pressure in the sealable enclosure decreases as the temperature of the gas within the sealable enclosure decreases so that the fold in the film layer closes, and wherein the strip of heat sensitive adhesive sealably re-joins the two upper fold edges of the fold to form a barrier that prevents contamination of the object.

10. The sealable enclosure of claim 1, wherein the sealable enclosure is made of a tube of packaging material, and wherein the fold is formed by folding a portion of the tube of the packaging material.

11. The sealable enclosure of claim 1, wherein the micro-perforation portion is a first micro-perforation portion, and further comprising:
an intermediate layer disposed between the film layer and the base portion, wherein the object is placed in a first interior region between the base portion and the intermediate layer; and
a second micro-perforation portion that is located in the intermediate layer,
wherein in response to the heating of the sealable enclosure with the object sealed therein, the gas vents from the first interior region through the second micro-perforation portion into a second interior region that is between the intermediate layer and the film layer, and
wherein the venting gas is retained within the second interior region until the temperature of the strip of heat sensitive adhesive increases to the predefined release temperature such that the strip of heat sensitive adhesive releases and the fold opens.

12. The sealable enclosure of claim 11, further comprising:
a plurality of second micro-perforation portions that are each located in the intermediate layer,
wherein in response to the heating of the sealable enclosure with the object sealed therein, the gas vents from the first interior region through the plurality of second micro-perforation portions into the second interior region that is between the intermediate layer and the film layer, and
wherein the venting gas is retained within the second interior region until the temperature of the strip of heat sensitive adhesive increases to the predefined release temperature such that the strip of heat sensitive adhesive releases and the fold opens.

13. The sealable enclosure of claim 1, wherein the fold with the strip of heat sensitive adhesive is a first fold with a first strip of heat sensitive adhesive that releases at a first predefined release temperature, wherein the film layer has at least one second fold formed therein, wherein the second fold is defined by the fold line and the two upper fold edges, and further comprising:
a second strip of heat sensitive adhesive extending along a length of and proximate to the two upper fold edges of the second fold; and
a second micro-perforation portion that is located in the second fold of the film layer between the fold line and the second strip of heat sensitive adhesive,
wherein when a temperature of the second strip of heat sensitive adhesive is less than a second predefined release temperature, the second strip of heat sensitive adhesive seals the two upper fold edges of the second fold together to prevent ambient contaminants from entering into the sealable enclosure via the second micro-perforation portion.

14. The sealable enclosure of claim 13, wherein the first predefined release temperature and the second predefined release temperature are substantially the same such that the first strip of heat sensitive adhesive and the second strip of heat sensitive adhesive release so that the first fold and the second fold open at substantially the same time.

15. The sealable enclosure of claim 13, wherein the first predefined release temperature and the second predefined release temperature are different such that the first strip of heat sensitive adhesive and the second strip of heat sensitive adhesive release at different temperatures so that the first fold and the second fold open at substantially different times.

* * * * *